(12) United States Patent
Deng

(10) Patent No.: US 7,765,564 B2
(45) Date of Patent: Jul. 27, 2010

(54) AUDIO BASED METHODS AND APPARATUS FOR DETECTING A CHANNEL CHANGE EVENT

(75) Inventor: Kevin K. Deng, Safety Harbor, FL (US)

(73) Assignee: The Nielsen Company (US), LLC, Schaumburg, IL (US)

(*) Notice: Subject to any disclaimer, the term of this patent is extended or adjusted under 35 U.S.C. 154(b) by 1126 days.

(21) Appl. No.: 10/570,567

(22) PCT Filed: Aug. 29, 2003

(86) PCT No.: PCT/US03/27336

§ 371 (c)(1),
(2), (4) Date: Feb. 27, 2006

(87) PCT Pub. No.: WO2005/032145

PCT Pub. Date: Apr. 7, 2005

(65) Prior Publication Data

US 2007/0061833 A1      Mar. 15, 2007

(51) Int. Cl.
    H04H 60/32        (2008.01)
    H04H 60/33        (2008.01)
(52) U.S. Cl. ............................... 725/18; 725/9; 725/10; 725/11; 725/12; 725/14
(58) Field of Classification Search ............... 725/9–21; 348/570, 1, 907; 455/2, 67
    See application file for complete search history.

(56) References Cited

U.S. PATENT DOCUMENTS

| | | | | |
|---|---|---|---|---|
| 4,677,466 | A | * | 6/1987 | Lert et al. ....................... 725/22 |
| 4,697,209 | A | * | 9/1987 | Kiewit et al. ................... 725/19 |
| 5,023,929 | A | | 6/1991 | Call |
| 5,457,807 | A | | 10/1995 | Weinblatt |
| 5,481,294 | A | * | 1/1996 | Thomas et al. ................. 725/20 |

(Continued)

FOREIGN PATENT DOCUMENTS

EP      0 813 716      5/2003

(Continued)

OTHER PUBLICATIONS

Written Opinion of the International Preliminary Examining Authority for PCT Application Serial No. PCT/US03/27336, 6 pages.

(Continued)

*Primary Examiner*—Scott Beliveau
*Assistant Examiner*—Christine Kurien
(74) *Attorney, Agent, or Firm*—Hanley, Flight & Zimmerman, LLC

(57) ABSTRACT

Methods and apparatus for detecting a channel change event are disclosed. The disclosed methods and apparatus detect a channel change event by monitoring an audio signal of an information presentation device such as a television system. The monitored audio signal is tested for certain characteristics indicative of a channel change event. In some information presentation devices, changing channels produces an audible "pop" sound. In other information presentation devices, the "pop" sound produced by changing channels is muted by the information presentation device. Once a channel change event is detected, an audience measurement system may automatically determine what program is on the information presentation device. Alternatively, an audience member may be prompted to manually enter what program is on the information presentation device.

29 Claims, 7 Drawing Sheets

U.S. PATENT DOCUMENTS

| | | |
|---|---|---|
| 5,581,800 A | 12/1996 | Fardeau |
| 5,630,203 A | 5/1997 | Weinblatt |
| 5,850,249 A | 12/1998 | Massetti |
| 5,881,360 A | 3/1999 | Fong |
| 5,918,223 A | 6/1999 | Blum et al. |
| 6,295,092 B1 | 9/2001 | Hullinger |
| 6,381,748 B1 | 4/2002 | Lin |
| 6,405,370 B1 | 6/2002 | Jarrell |
| 2001/0007149 A1 | 7/2001 | Smith |
| 2002/0010919 A1 | 1/2002 | Lu |
| 2002/0015574 A1 | 2/2002 | Suito et al. |
| 2003/0131350 A1 | 7/2003 | Peiffer |

OTHER PUBLICATIONS

International Preliminary Examination Report for PCT Application Serial No. PCT/US03/27336, 12 pages.

International Search Report for PCT Application Serial No. PCT/US03/27336, 4 pages.

Supplementary European Search Report, mailed on Aug. 6, 2007, in corresponding EP Application No. 03 81 8813, 3 pages.

* cited by examiner

AUDIO BASED METHODS AND APPARATUS FOR DETECTING A CHANNEL CHANGE EVENT

TECHNICAL FIELD

The present disclosure pertains to audience measurement systems and, more particularly, to methods and apparatus for detecting a channel change event.

BACKGROUND

Determining how many and what type of people are viewing which television programs helps television program producers improve their shows and determine a price for advertising slots during those shows. In addition, accurate television viewing demographics allow advertisers to target certain types and sizes of audiences. Similarly, radio listening demographics are also useful to producers and advertisers.

To collect these demographics, an audience measurement company, such as Nielsen Media Research, may enlist a plurality of television viewers, radio listeners, and/or any other type of audience member. The habits of the enlisted audience members are collected to statistically determine the demographics of the audiences and to develop ratings of those programs. Surveys may be used, but automatic measurement systems are preferred because of the increased accuracy of the statistics and the convenience for the viewers.

One aspect of automatic viewer measurement systems is to record information used to determine what television program is showing on a television or playing on a radio. Many automatic viewer measurement systems are non-invasive systems, which do not require installation of circuitry within the television or radio. Instead, external devices are used to determine what television program is showing or what radio program is playing. In contrast, invasive measurement systems install circuitry within the information presenting device (e.g., TV, radio, etc.) of the audience member. Invasive techniques are less desirable because of the possibility of damage to the information presentation device.

DETAILED DESCRIPTION

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, while the following disclosure is made with respect to example television systems, it should be understood that the disclosed system may be used in many other applications. For example, radio systems may employ the techniques described herein. Accordingly, while the following describes example systems and processes, persons of ordinary skill in the art will readily appreciate that the disclosed examples are not the only way to implement such systems.

In general, the methods and apparatus described herein detect a channel change event by monitoring an audio signal of an information presentation device such as a television system. The monitored audio signal is tested for certain characteristics indicative of a channel change event. In some television systems, changing channels produces an audible "pop" sound or transient. By detecting a normal television audio signal, followed by a transient television audio signal, followed by a normal television audio signal, the methods and apparatus described herein can signal when a channel change event has likely occurred. Normal and transient signals are defined using volume level thresholds and/or frequency thresholds. In other television systems, the "pop" sound produced when changing channels is muted by the television system. In such television systems, channel change events may be detected by detecting a normal television audio signal, followed by a muted television audio signal, followed by a normal television audio signal. Muted signals are defined using volume level thresholds and/or frequency thresholds. Once a channel change event is detected, an audience measurement system may automatically determine what program is on the information presentation device. Alternatively, an audience member may be prompted to manually enter what program is on the information presentation device.

Figure 1:
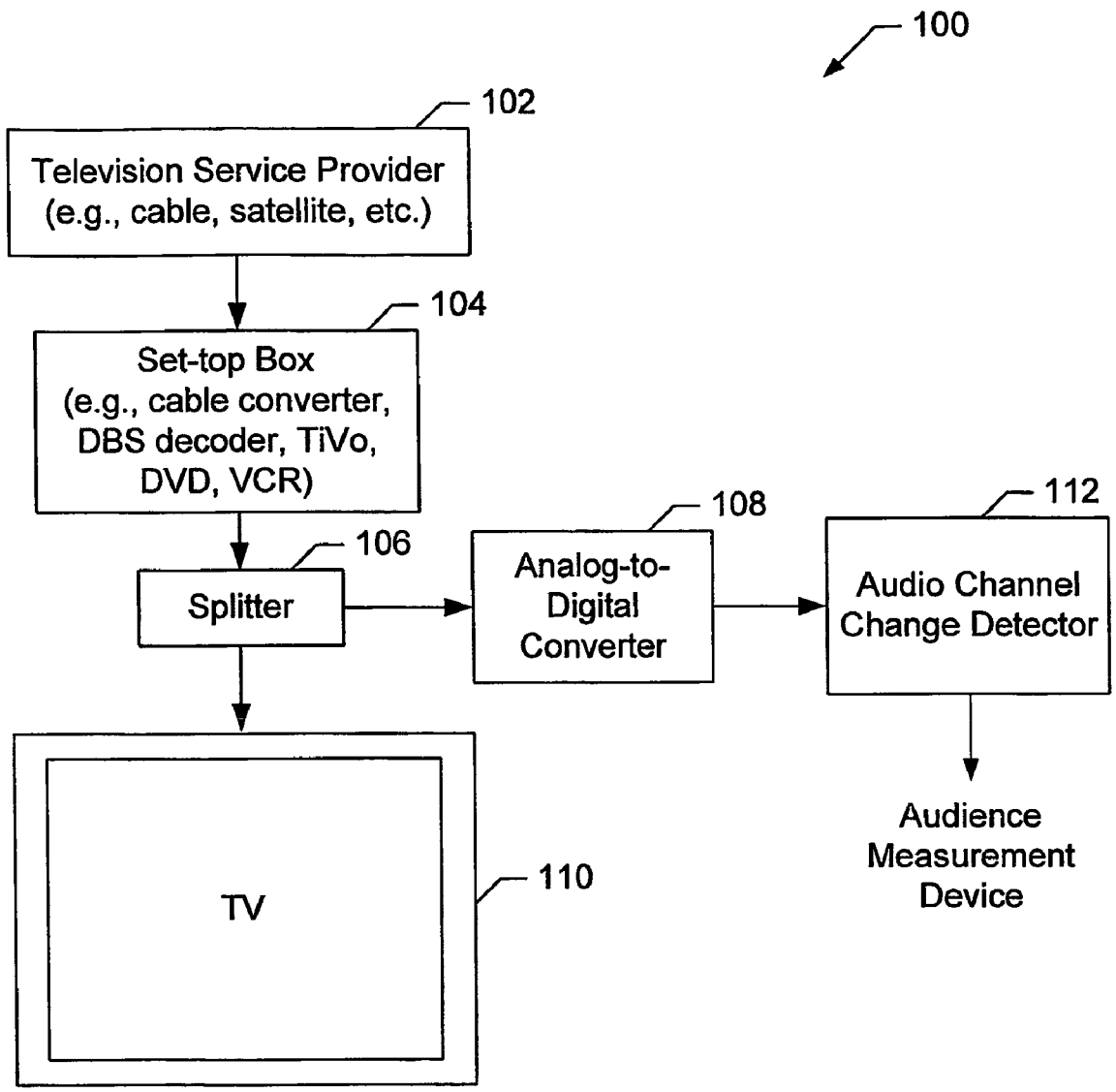
FIG. 1 is a block diagram illustrating an example television system.

A block diagram of an example television system 100 is illustrated in FIG. 1. The television system 100 illustrated includes a television service provider 102, a set-top box 104, a signal splitter 106, an analog-to-digital (A/D) converter 108, a television 110, and an audio channel change detector 112. The components of the television system 100 may be connected as shown.

The television service provider 102 may be any television service provider 102 such as a cable television service provider, a satellite television service provider, and/or a radio frequency (RF) television service provider. The television service provider 102 may provide analog and/or digital television signals. For example, the television service provider 102 may provide analog and/or digital signals over a coaxial cable (e.g., AT&T® cable). Similarly, the television service provider 102 may provide analog and/or digital signals over a wireless connection, such as a satellite connection (e.g., DIRECTV®) and/or a terrestrial broadcast tower (e.g., "free" TV).

The set-top box 104 may be any set-top box such as a cable television converter, a direct broadcast satellite (DBS) decoder, a digital video recorder (e.g., TiVo®), a digital video disc (DVD) player, or a video cassette recorder (VCR). The set-top box 104 receives a plurality of television channels from the television service provider 102. Typically, the set-top box 104 selects one of the plurality of television channels based on a user input, and outputs an audio/video signal indicative of the selected television channel. In the case of an analog signal, the set-top box 104 tunes to a particular frequency to obtain the selected television channel. In the case of a digital signal, the set-top box 104 decodes certain packets of data to obtain the selected television channel. Of course, the set-top box 104 is optional. For example, receiving terrestrial broadcast television may not require a set-top box 104.

The output from the set-top box 104 (if included) is fed to a signal splitter 106 such as a y-splitter. In one example, the signal splitter produces two signals indicative of the output from the set-top box 104. One of the two signals is fed to the television 110. The other signal is fed to the A/D converter 108. The television 110 may be any type of television. For example, the television may be an NTSC (National Television Standards Committee) television, a high definition television (HDTV), etc. Of course, a person of ordinary skill in the art will readily appreciate that any number of signals may be produced by the signal splitter 106.

The analog-to-digital converter 108 may be any type of analog-to-digital converter 108. The analog-to-digital converter 108 converts a standard television audio signal into digital data. For example, the analog-to-digital converter 108 may convert NTSC audio signals to a digital representation of an audio wave. Alternatively or in addition, the analog-to-digital converter 108 may convert PAL (Phase Alternation Line) audio signals and/or SECAM (Sequential Couleur avec Memoire) audio signals to digital data. Regardless of the television broadcast standard converted, the digital data may be any size and may encode any number of data points. Alternatively, an analog sampling device may be used instead of the A/D converter 108.

The analog-to-digital converter 108 periodically (e.g., at 200 MHz) takes a sample and passes the digital data representing the television audio to the audio channel change detector 112. The audio channel change detector 112 scans the digital data it receives to determine if channel change events are occurring.

Figure 2:
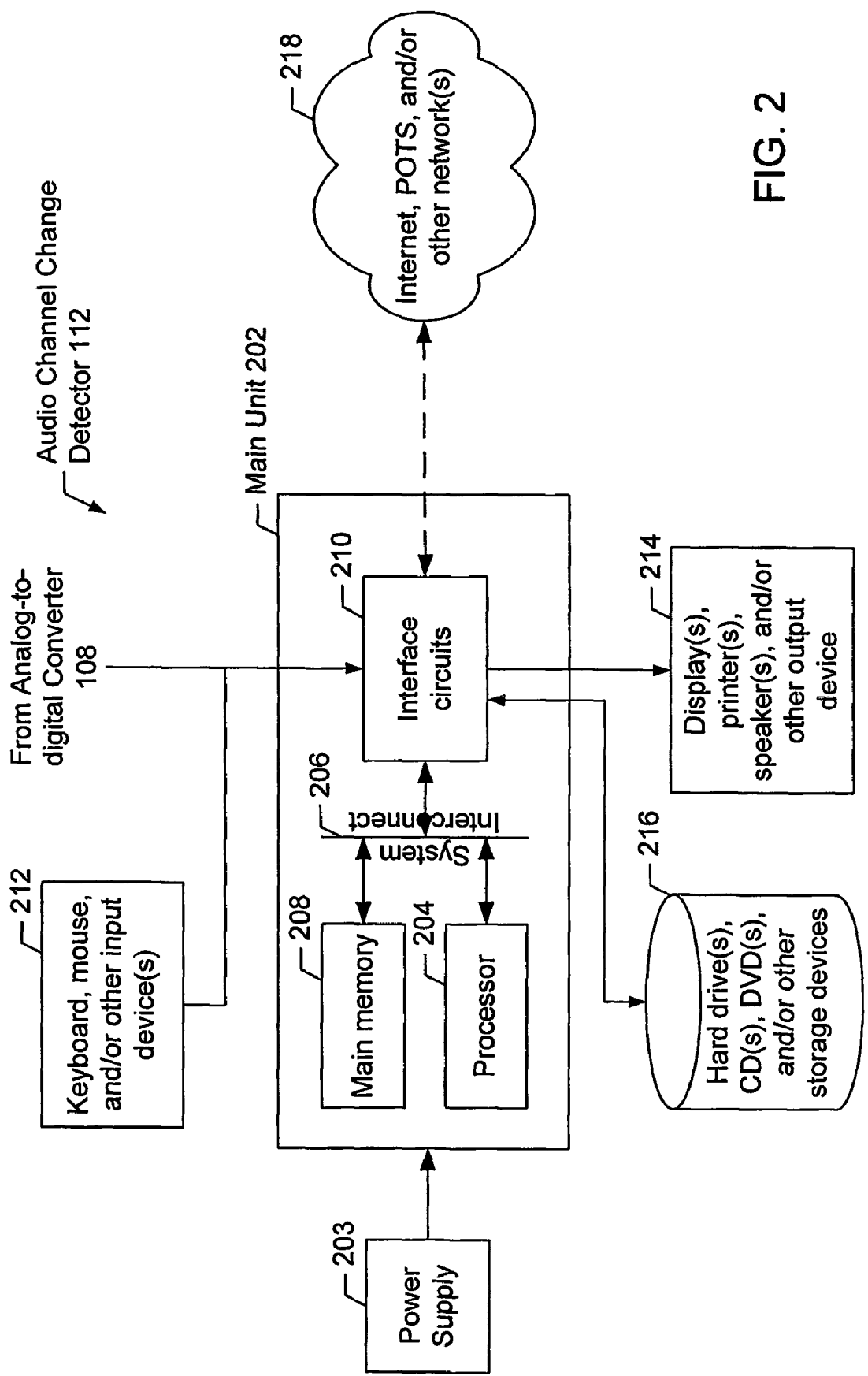
FIG. 2 is a block diagram illustrating an example audio channel change detector.

A block diagram of an example audio channel change detector 112 is illustrated in FIG. 2. The channel change detector 112 may be a personal computer (PC), an application specific device, and/or any other computing device. In an example, the channel change detector 112 includes a main processing unit 202 powered by a power supply 203. The main processing unit 202 may include a processor 204 electrically coupled by a system interconnect 206 to a main memory device 208 and one or more interface circuits 210. In an example, the system interconnect 206 is an address/data bus. Of course, a person of ordinary skill in the art will readily appreciate that interconnects other than busses may be used to connect the processor 204 to the main memory device 208. For example, one or more dedicated lines and/or a crossbar may be used to connect the processor 204 to the main memory device 208.

The processor 204 may include any type of well known central processing unit (CPU), such as a microprocessor from the Intel Pentium® family of microprocessors, the Intel Itanium® family of microprocessors, and/or the Intel XScale® family of processors. The processor 204 may include any type of well known cache memory, such as static random access memory (SRAM). The main memory device 208 may include dynamic random access memory (DRAM), but may also include non-volatile memory. In an example, the main memory device 208 stores a software program which is executed by processor 204 in a well known manner.

The interface circuit(s) 210 may be implemented using any type of well known interface standard, such as an analog cable interface, a digital cable interface, a satellite signal interface, an Ethernet interface, and/or a Universal Serial Bus (USB) interface. One or more input devices 212 may be connected to the interface circuits 210 for entering data and commands into the main processing unit 202. For example, an input device 212 may be a keyboard, mouse, touch screen, track pad, track ball, isopoint, and/or a voice recognition system. In addition, the interface circuit(s) 210 handle digital data inputs from the analog-to-digital converter 108. In an example, the analog-to-digital converter 108 is incorporated into the channel change detector 112.

One or more displays, printers, speakers, and/or other output devices 214 may also be connected to the main processing unit 202 via one or more of the interface circuits 210. The display 214 may be cathode ray tube (CRTs), liquid crystal displays (LCDs), or any other type of display. The display 214 may generate visual indications of data generated during operation of the main processing unit 202. The visual displays may include prompts for human operator input, calculated values, detected data, etc.

The channel change detector 112 may also include one or more storage devices 216. For example, the channel change detector 112 may include one or more hard drives, a compact disk (CD) drive, a digital versatile disk drive (DVD), and/or other computer media input/output (I/O) devices.

The channel change detector 112 may also exchange data with other devices via a connection to a network 218. The network connection may be any type of network connection, such as an Ethernet connection, digital subscriber line (DSL), telephone line, coaxial cable, etc. The network 218 may be any type of network, such as the Internet, a telephone network, a cable network, and/or a wireless network.

Figure 3:
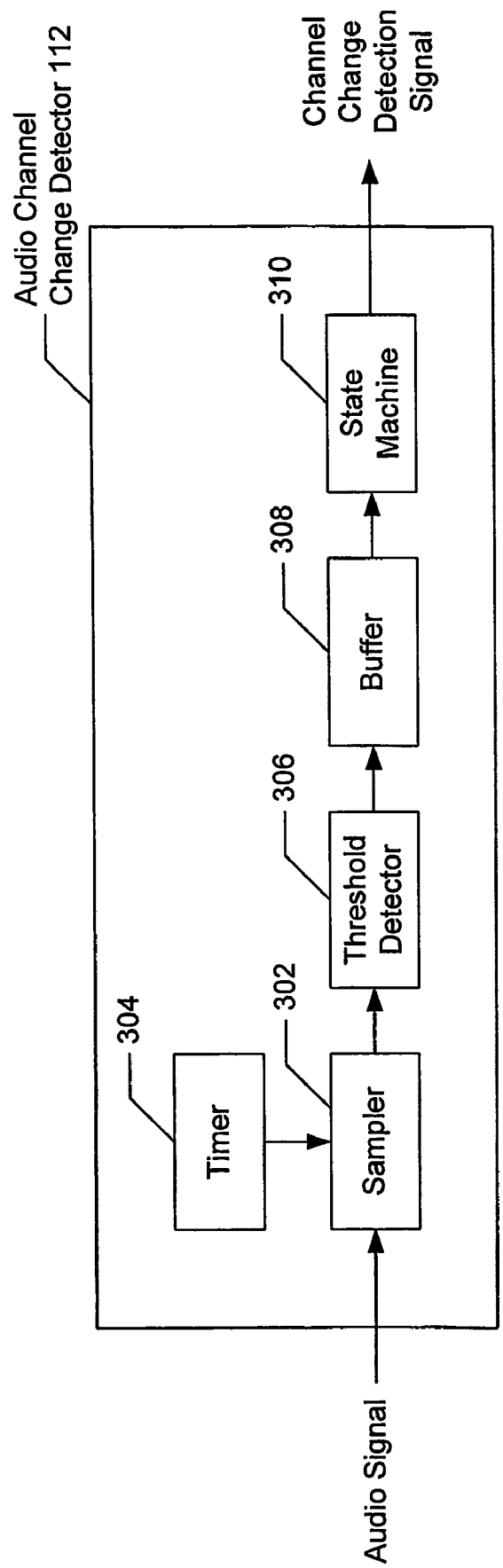
FIG. 3 is a block illustrating another example audio channel change detector.

A block diagram of another example audio channel change detector 112 is illustrated in FIG. 3. In this example, the channel change detector 112 includes a sampler 302, a timer 304, a threshold detector 306, a buffer 308, and a state machine 310 interconnected as shown. The audio channel change detector 112 of FIG. 3 may be implemented using hardware and/or software, such as dedicated circuits and/or processor(s) executing instructions.

In operation, the sampler 302 periodically captures a portion of the audio signal from the television system 100. The sampler 302 may be any type of sampler. For example, the sampler may an analog-to-digital converter. In such an event, the analog-to-digital converter 108 is not required. In another example, the sampler 302 may be a voltage and/or frequency measurement circuit. The frequency at which the sampler 302 captures portions of the audio signal is based on a signal from the timer 304. The timer may be any type of timer such as a crystal oscillator or a resonator.

In this example, the output of the sampler 302 is passed to the threshold detector 306. The output of the sampler 302 may be digital or analog. The threshold detector 306 compares the output of the sampler 302 to one or more predetermined thresholds. The threshold detector 306 may logically compare digital data indicative of the audio signal to one or more predetermined digital thresholds. Alternatively, the threshold detector 306 may compare one or more analog voltage levels indicative of the audio signal to a one or more predetermined voltage thresholds. For example, the threshold detector may be a digital comparator, an analog comparator, or a processor executing one or more comparison instructions.

Each time the threshold detector 306 makes a comparison of the audio signal to the predetermined thresholds, the threshold detector 306 outputs a signal to the buffer 308. The signal indicates if the audio signal is greater than or less than a predetermined threshold. The buffer 308 stores data indicative of the series of signals coming form the threshold detector 306. The buffer 308 may be any type of buffer such as a shift register or an addressable memory.

Data stored in the buffer 308 is then passed to the state machine 310. The state machine 310 determines if a channel change event has occurred based on the sequence of threshold crossings reported by the audio channel change detector 112. The state machine 310 may be implemented using any type of circuitry. For example, the state machine 310 may be a logic circuit or a processor executing instructions as described below. When the state machine 310 detects a channel change event, the state machine 310 outputs a signal indicative of the channel change event. For example, the signal may be a voltage level or a pulse.

Figure 4:
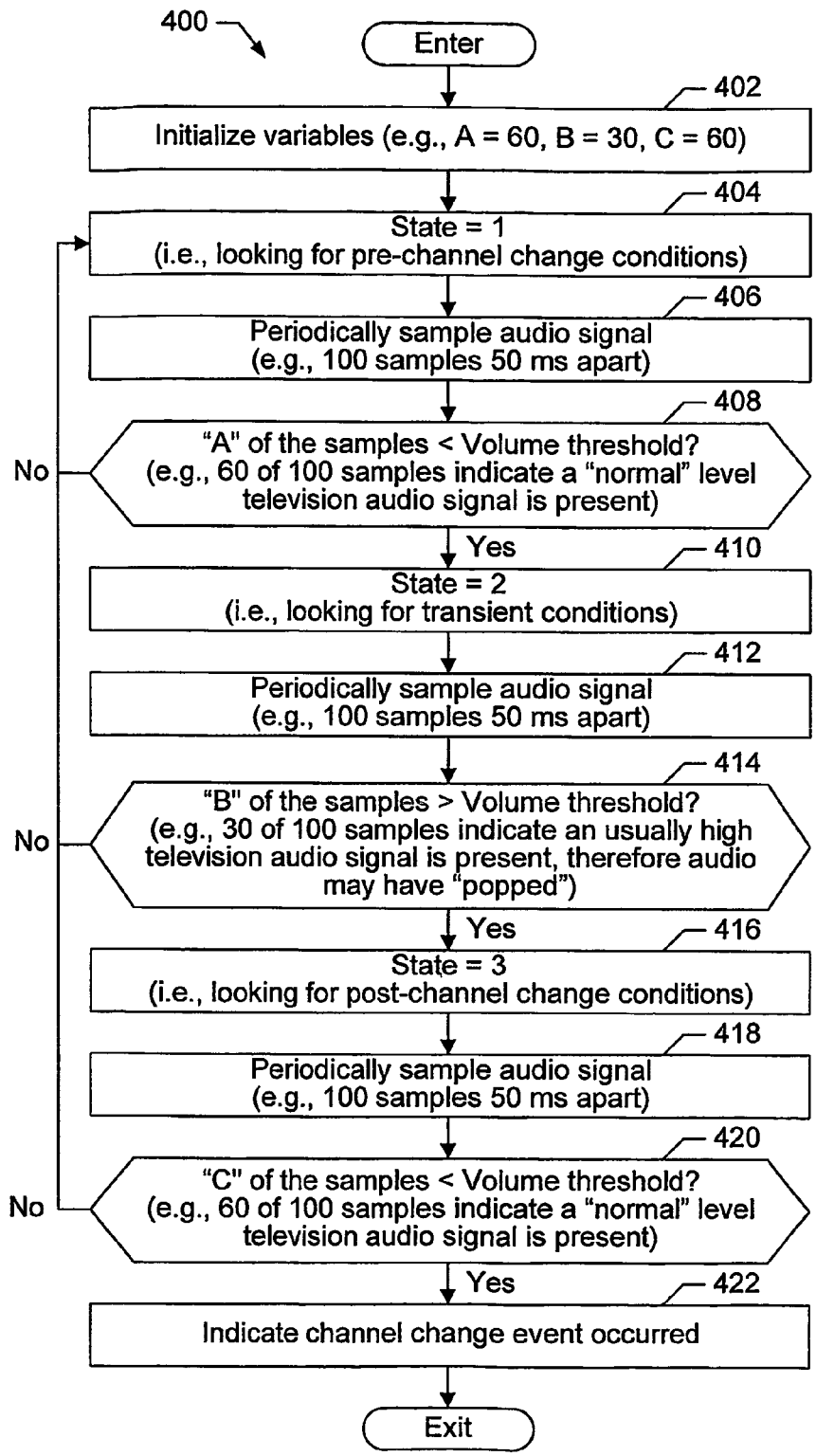
FIG. 4 is a flowchart representative of machine readable instructions that may be executed by a device to implement an example method of detecting a television channel change event.

An example process 400 for detecting a television channel change event is illustrated in FIG. 4. Preferably, the process 400 is embodied in one or more software programs that are stored in one or more memories and executed by one or more processors (e.g., processor 204) in a well known manner. However, some or all of the blocks of the process 400 may be performed manually and/or by another hardware device. For example, the process 400 may be executed by the audio channel change detector 112 of FIG. 2 and/or the audio channel change detector 112 of FIG. 3. Although the process 400 is described with reference to the flowchart illustrated in FIG. 4, a person of ordinary skill in the art will readily appreciate that many other methods of performing the process 400 may be used. For example, the order of many of the blocks may be altered, the operation of one or more blocks may be changed, blocks may be combined, and/or blocks may be eliminated.

Figure 6:
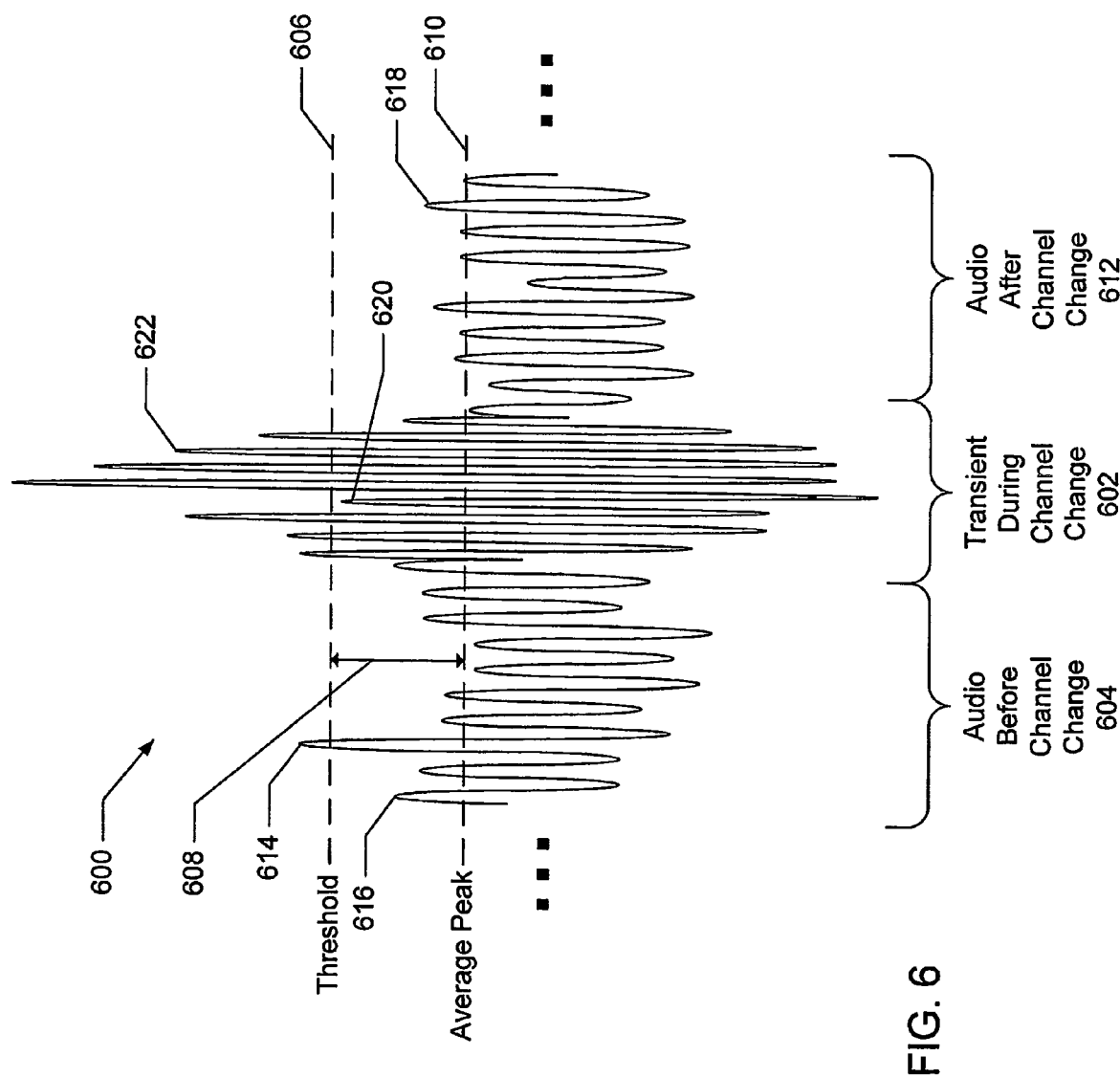
FIG. 6 is an example audio signal with a transient during a channel change event.

In general, the example process 400 detects a television channel change event by monitoring an audio signal of a television system 100. The monitored audio signal is tested for certain characteristics indicative of a channel change event. In some television systems 100, changing channels produces an audible "pop" sound or transient. By detecting a normal television audio signal, followed by a transient television audio signal, followed by a normal television audio signal, the methods and apparatus described herein can signal when a channel change event has likely occurred. Normal and transient signals are defined using volume level thresholds and/or frequency thresholds as described below. An example audio signal with a transient during a channel change event is illustrated in FIG. 6.

The example process 400 begins when the audio channel change detector 112 initializes a plurality of variables (block 402). The variables may be initialized based on a type of television equipment (e.g., a brand). For example, a variables "A", "B", and "C" may be initialized. Variable "A" may represent the number of samples (e.g., 60) of a group of samples (e.g., 100) that must be below a threshold (e.g., a volume level) during a first state in order to advance the process 400 to a second state. Variable "B" may represent the number of samples (e.g., 90) of a group of samples (e.g., 100) that must be above a threshold (e.g., a volume level) during the second state in order to advance the process 400 to a third state. Variable "C" may represent the number of samples (e.g., 60) of a group of samples (e.g., 100) that must be below a threshold (e.g., a volume level) during the third state in order to indicate that a channel change event occurred. Of course the values used herein are merely examples, and many other variables may be initialized. In addition, these variables may be dynamically updated. For example, transient audio signals may be identified by detecting energy peaks relative to a substantially stationary signal. In other words, the volume levels described herein may be relative volume levels, not absolute volume levels.

After initialization (block 402), the process 400 starts in a first state (block 404). In the first state, the process 400 looks for certain pre-channel change conditions. For example, the process 400 may look for normal audio signals, which may be characterized by one or more predetermined volume level thresholds and/or predetermined frequency thresholds. In one example, a predetermined number of audio signal samples being less than a predetermined threshold is indicative of a "normal" audio signal.

Accordingly, the process 400 periodically samples the audio signal (block 406). For example, the process 400 may take 100 samples that are 50 milliseconds (ms) apart. As described above, the samples may be analog samples and/or digital samples. Once a plurality of audio samples are taken (or after every sample), the example process 400 checks if a certain number of the audio samples are below a predetermined threshold (block 408). For example, the process 400 may determine if 60 out of 100 samples are below a certain volume level threshold. The threshold volume level may be a moving average threshold plus a margin constant (i.e., a band slightly above a historical average associated with the audio signal). If a sufficient number of the audio signal samples are not below the threshold, the example process 400 stays in the first state (block 404) and takes additional samples of the audio signal (block 406). If a sufficient number of the audio signal samples are below the threshold (i.e., normal audio is occurring), the example process 400 advances to a second state (block 410).

In the second state, the example process 400 looks for a transient condition (block 410). The transient condition may be characterized by one or more predetermined volume level thresholds and/or predetermined frequency thresholds. In one example, a transient audio signal is detected by finding a predetermined number of audio signal samples above a predetermined threshold for a predetermined time period. An example audio signal with a transient during a channel change event is illustrated in FIG. 6.

Accordingly, in the second state, the process 400 periodically samples the audio signal (block 412). For example, the process 400 may take 100 samples that are 50 milliseconds (ms) apart. Again, the samples may be analog samples and/or digital samples. Once a plurality of audio samples are taken (or after every sample), the example process 400 checks if a certain number of the audio samples are above a predetermined threshold (block 414). For example, the process 400 may determine if 30 out of 100 samples are above a certain volume level threshold. Again, the threshold volume level may be a moving average threshold plus a margin constant (i.e., a band slightly above a historical average associated with the audio signal). If a sufficient number of the audio signal samples are not above the threshold, the example process 400 reverts back to the first state (block 404) and takes additional samples of the audio signal (block 406). However, if a sufficient number of the audio signal samples are above the threshold (e.g., a transient spike occurred), the example process 400 advances to a third state (block 416).

In the third state, the process 400 looks for certain post-channel change conditions. For example, the process 400 may look for normal audio signals again. Accordingly, the process 400 periodically samples the audio signal (block 418). Once a plurality of audio samples are taken (or after every sample), the example process 400 determines if a certain number of the audio samples are below a predetermined threshold (block 420). For example, the process 400 may determine if 60 out of 100 samples are below a certain volume level threshold. If a sufficient number of the audio signal samples are not below the threshold, the example process 400 reverts back to the first state (block 404) and takes additional samples of the audio signal (block 406). However, if a sufficient number of the audio signal samples are below the threshold (i.e., normal audio is occurring again), the example process 400 indicates a channel change event has occurred (block 422). Subsequently, the process 400 may repeat in order to detect additional channel change events.

Figure 5:
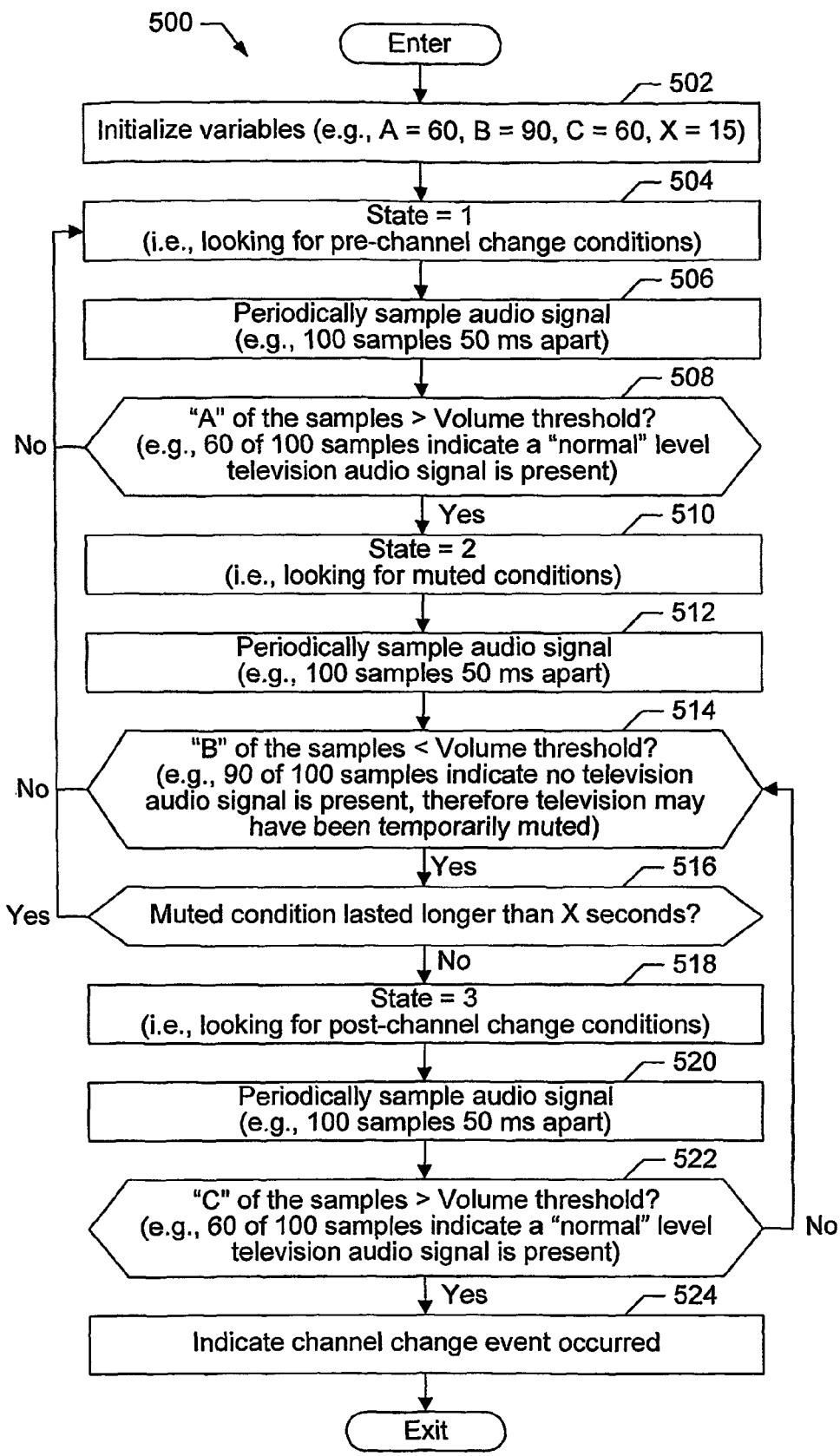
FIG. 5 is a flowchart representative of machine readable instructions that may be executed by a device to implement another example method of detecting a television channel change event.

Another example process 500 for detecting a television channel change event is illustrated in FIG. 5. Preferably, the process 500 is embodied in one or more software programs that are stored in one or more memories and executed by one or more processors (e.g., processor 204) in a well known manner. However, some or all of the blocks of the process 500 may be performed manually and/or by another hardware device. For example, the process 500 may be executed by the audio channel change detector 112 of FIG. 2 and/or the audio channel change detector 112 of FIG. 3. Although the process 500 is described with reference to the flowchart illustrated in FIG. 5, a person of ordinary skill in the art will readily appreciate that many other methods of performing the process 500 may be used. For example, the order of many of the blocks may be altered, the operation of one or more blocks may be changed, blocks may be combined, and/or blocks may be eliminated.

Figure 7:
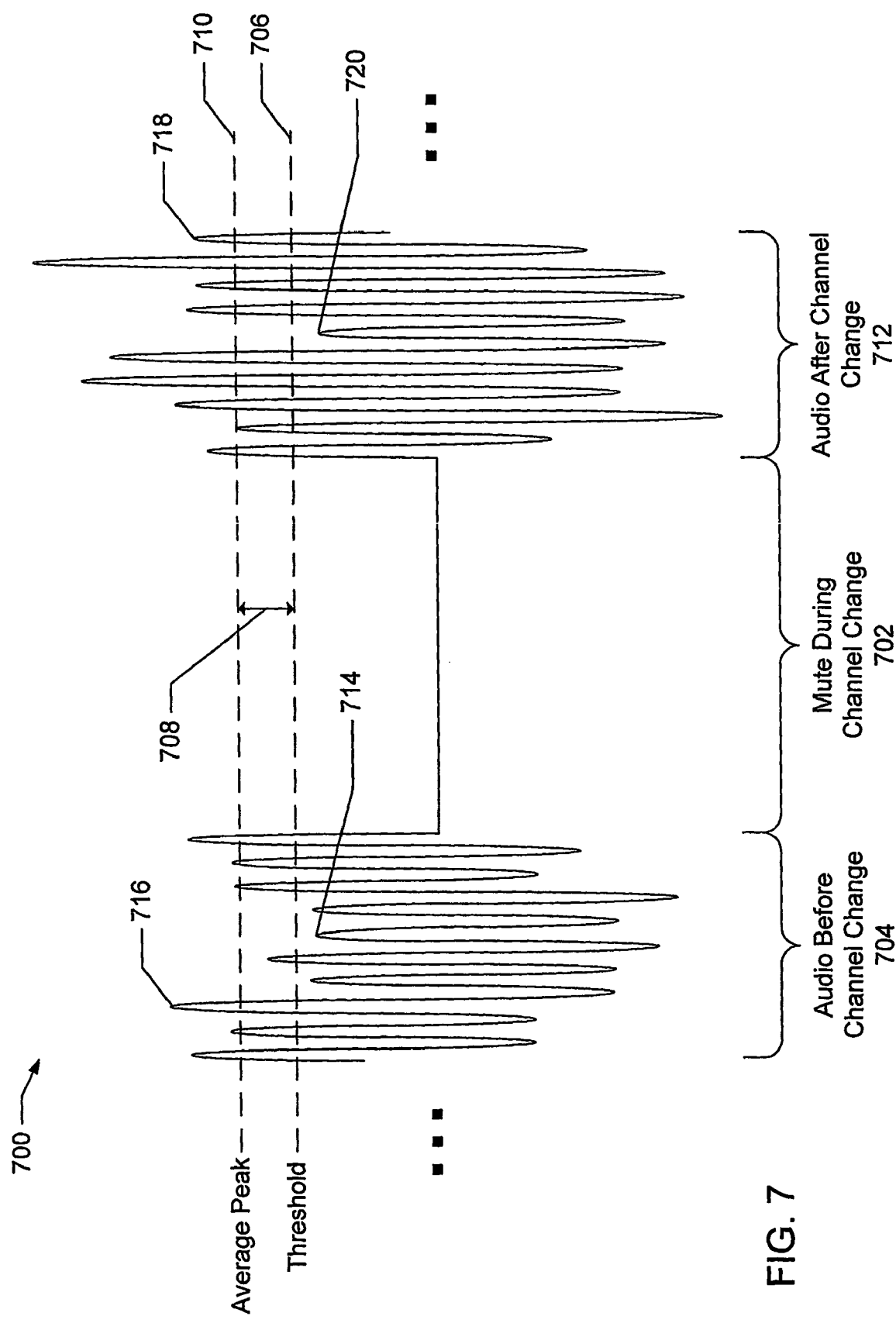
FIG. 7 is an example audio signal with a mute during a channel change event.

In general, the example process 500 detects a television channel change event by monitoring an audio signal of a television system 100. The monitored audio signal is tested for certain characteristics indicative of a channel change event. In some television systems 100, the "pop" sound produced by changing channels is muted by the television system 100. In such television systems 100, channel change events may be detected by detecting a normal television audio signal, followed by a muted television audio signal, followed by a normal television audio signal. Normal and muted signals are defined using volume level thresholds and/or frequency thresholds as described below. An example audio signal with a mute during a channel change event is illustrated in FIG. 7.

The example process 500 begins when the audio channel change detector 112 initializes a plurality of variables (block 502). These variables may be initialized based on a type of television equipment (e.g., a brand). For example, variables "A", "B", "C" and "X" may be initialized. Variable "A" may represent the number of samples (e.g., 60) of a group of samples (e.g., 100) that must be above a threshold (e.g., a volume level) during a first state in order to advance the process 400 to a second state. Variable "B" may represent the number of samples (e.g., 90) of a group of samples (e.g., 100) that must be below a threshold (e.g., a volume level) during the second state in order to advance the process 400 to a third state. Variable "C" may represent the number of samples (e.g., 60) of a group of samples (e.g., 100) that must be above a threshold (e.g., a volume level) during the third state in order to indicate that a channel change event occurred. Variable "X" may represent a time period (e.g., 15 seconds) after which a muted condition is treated as a television off condition or a "user mute" condition. Of course the values used herein are merely examples, and many other variables may be initialized. In addition, these variables may be dynamically updated. For example, muted audio signals may be identified by detecting energy lows relative to a substantially stationary signal. In other words, the volume levels described herein may be relative volume levels, not absolute volume levels.

After initialization (block 502), the process 500 starts in a first state (block 504). In the first state, the process 500 looks for certain pre-channel change conditions. For example, the process 500 may look for normal audio signals. Normal audio signals may be characterized by one or more predetermined volume level thresholds and/or predetermined frequency thresholds. In one example, a predetermined number of audio signal samples being less than a predetermined threshold is indicative of a "normal" audio signal.

Accordingly, the process 500 periodically samples the audio signal (block 506). For example, the process 500 may take 100 samples that are 50 milliseconds (ms) apart. As described above, the samples may be analog samples and/or digital samples. Once a plurality of audio samples are taken (or after every sample), the example process 500 checks if a certain number of the audio samples are above a predetermined threshold (block 508). For example, the process 500 may determine if 60 out of 100 samples are above a certain volume level threshold. The threshold volume level may be a moving average threshold minus a margin constant (i.e., a band slightly below historically averaged audio signals). If a sufficient number of the audio signal samples are not above the threshold, the example process 500 stays in the first state (block 504) and takes additional samples of the audio signal (block 506). If a sufficient number of the audio signal samples are above the threshold (i.e., normal audio is occurring), the example process 500 advances to a second state (block 410).

In the second state, the example process 500 looks for a muted condition (block 510). The muted condition may be characterized by one or more predetermined volume level thresholds and/or predetermined frequency thresholds. In one example, a muted audio signal is detected by finding a predetermined number of audio signal samples below a predetermined threshold for a predetermined time period. An example audio signal with a mute during a channel change event is illustrated in FIG. 7.

Accordingly, the process 500 periodically samples the audio signal (block 512) and checks if a certain number of the audio samples are below a predetermined threshold (block 514). Again, the threshold volume level may be a band slightly below historically averaged audio signals. If a sufficient number of the audio signal samples are not below the threshold, the example process 500 reverts back to the first state (block 504) and takes additional samples of the audio signal (block 506). However, if a sufficient number of the audio signal samples are below the threshold (i.e., a mute occurred), the example process 500 checks if the muted condition has lasted longer than a predetermined amount of time (block 516). If the muted condition has lasted longer than a predetermined amount of time, the process 500 reverts back to the first state (block 504). For example, if a muted condition exists for 30 minutes, the example process 500 may assume the television has been turned off. In another example, if the muted condition lasts 15 seconds, it may be assumed that the viewer intentionally muted the television rather than the muting having been caused by a channel change event. If a sufficient number of the audio signal samples are below the threshold (i.e., a mute occurred), and the muted condition has not lasted longer than a predetermined amount of time (e.g., the television is not intentionally muted or turned off), the process 500 advances to a third state (block 518).

In the third state, the process 500 looks for certain post-channel change conditions. For example, the process 500 may look for normal audio signals again. Accordingly, the process 500 periodically samples the audio signal (block 520) and checks if a certain number of the audio samples are above a predetermined threshold (block 522). If a sufficient number of the audio signal samples are not above the threshold, the example process 500 reverts back to block 514 to determine if audio is still muted. If the audio is still muted, the process 500 determines if the mute condition has lasted long enough to assume the television has been turned off (block 516). However, if a sufficient number of the audio signal samples are above the threshold (i.e., normal audio is occurring again), the example process 500 indicates a channel change event has occurred (block 524).

In addition to each of the separate processes 400 and 500, a person of ordinary skill in the art will readily appreciate that process 400 and process 500 may be combined. For example, when looking for normal audio, the combined process may look for volume levels that are both (i) above a first predetermined threshold like process 400 and (ii) below a second predetermined threshold like process 500. Similarly, the combined process may accept either a transient condition or a muted condition as satisfying the conditions of the second state.

An example audio signal 600 generated during a channel change event is illustrated in FIG. 6. In this example, a transient signal 602 is generated during the channel change event. The portion 604 of the audio which occurs before the transient 602 is normal or stationary audio because a certain percentage (e.g., >80%) of the audio before the channel change has a volume (or energy) level below a threshold 606. The threshold may be a moving average plus some constant 608 (i.e., a horizontal line slightly above an average peak line 610). Similarly, the portion 612 of the audio which occurs after the transient 602 is "normal" or "stationary" audio because a certain percentage (e.g., >80%) of the audio after the channel change also has a volume (or energy) level below the threshold 606.

In the portion 604 of the audio before the channel change, some of the audio peaks 614 may go above the threshold 606, but most of the audio peaks 616 fall below the threshold 606. Similarly, in the portion 612 of the audio after the channel change, most of the audio peaks 618 fall below the threshold 606. Conversely, in the portion 602 of the audio during the channel change, some of the audio peaks 620 may fall below the threshold 606, but most of the audio peaks 622 reach above the threshold 606.

Another example audio signal 700 generated during a channel change event is illustrated in FIG. 7. In this example, a mute signal 702 is generated during the channel change event. The portion 704 of the audio which occurs before the mute 702 is normal or stationary audio because a certain percentage (e.g., >80%) of the audio before the channel change has a volume (or energy) level above a threshold 706. The threshold may be a moving average plus some constant 708 (i.e., a horizontal line slightly below an average peak line 710). Similarly, the portion 712 of the audio which occurs after the mute 702 is normal or stationary audio because a certain percentage (e.g., >80%) of the audio after the channel change also has a volume (or energy) level above the threshold 706.

In the portion 704 of the audio before the channel change, some of the audio peaks 714 may fall below the threshold 706, but most of the audio peaks 716 go above the threshold 706. Similarly, in the portion 712 of the audio after the channel change, most of the audio peaks 718 reach above the threshold 706, even though some peaks 720 may fall below the threshold 706. In the example illustrated in FIG. 7, the portion 702 of the audio that is muted falls entirely below the threshold 706. However, a person of ordinary skill in the art will readily appreciate that the portion 702 of the audio that is muted need not fall entirely below the threshold 706.

Although certain apparatus have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of detecting a television channel change event, the method comprising:
   capturing a television audio signal in a memory device; and
   indicating that the television channel change event is detected if (i) a first portion of the television audio signal in the memory device represents sounds above a volume threshold, (ii) a second portion of the television audio signal in the memory device represents sounds below the volume threshold for at least a majority of the second portion of the television audio signal in the memory device, (iii) a third portion of the television audio signal in the memory device represents sounds above the volume threshold, (iv) if the second portion of the television audio signal in the memory device is longer than a first predetermined duration, (v) if the second portion of the television audio signal in the memory device is shorter than a second predetermined duration, and (vi) if the first portion of the television audio signal in the memory device is longer than a third predetermined duration.

2. A method as defined in claim 1, wherein determining if the first portion of the television audio signal represents sounds above the volume threshold comprises determining if the first portion of the television audio signal represents sounds above the volume threshold for at least a majority of the first portion of the television audio signal.

3. A method as defined in claim 1, further comprising storing a parameter used in detecting the channel change event, the parameter being selected based on a type of television equipment.

4. A method as defined in claim 1, wherein the volume threshold comprises a moving average threshold and a volume constant.

5. A method of detecting a television channel change event, the method comprising:
   capturing a television audio signal in a memory device;
   storing a parameter used in detecting the channel change event, the parameter being selected based on a type of television equipment, wherein the parameter indicates that the type of television equipment mutes audio when changing channels; and
   indicating that the television channel change event is detected if (i) a first portion of the television audio signal in the memory device represents sounds above a volume threshold, (ii) a second portion of the television audio signal in the memory device represents sounds below the volume threshold, and (iii) a third portion of the television audio signal in the memory device represents sounds above the volume threshold.

6. A method as defined in claim 3, wherein the parameter is indicative of a duration associated with a muting period.

7. A method of detecting a television channel change event, the method comprising:
   capturing a television audio signal in a memory device; and
   indicating that the television channel change event is detected if (i) a first portion of the television audio signal in the memory device represents sounds below a volume threshold, (ii) a second portion of the television audio signal in the memory device represents sounds above the volume threshold for at least a majority of the second portion of the television audio signal in the memory device, (iii) a third portion of the television audio signal in the memory device represents sounds below the volume threshold, (iv) if the second portion of the television audio signal in the memory device is longer than a first predetermined duration, (v) if the second portion of the television audio signal in the memory device is shorter than a second predetermined duration, and (vi) if the first portion of the television audio signal in the memory device is longer than a third predetermined duration.

8. A method as defined in claim 7, wherein determining if the first portion of the television audio signal represents sounds below the volume threshold comprises determining if the first portion of the television audio signal represents sounds below the volume threshold for at least a majority of the first portion of the television audio signal.

9. A method as defined in claim 7, further comprising storing a parameter used in detecting the channel change event, the parameter being selected based on a type of television equipment.

10. A method as defined in claim 7, wherein the volume threshold comprises a moving average threshold and a volume constant.

11. A method of detecting a television channel change event, the method comprising:
capturing a television audio signal in a memory device;
storing a parameter used in detecting the channel change event, the parameter being selected based on a type of television equipment, wherein the parameter indicates that the type of television equipment does not mute audio when changing channels; and
indicating that the television channel change event is detected if (i) a first portion of the television audio signal in the memory device represents sounds below a volume threshold, (ii) a second portion of the television audio signal in the memory device represents sounds above the volume threshold, and (iii) a third portion of the television audio signal in the memory device represents sounds below the volume threshold.

12. An apparatus for detecting a channel change event, the apparatus comprising:
an analog-to-digital converter structured to capture an audio signal;
a memory device structured to store digital data indicative of a first portion, a second portion, and a third portion of the audio signal; and
a controller operatively coupled to the analog-to-digital converter and the memory device, the controller being structured to indicate the channel change event is detected if (i) the first portion of the audio signal represents sounds above a volume threshold, (ii) the second portion of the audio signal represents sounds below the volume threshold for at least a majority of the second portion of the audio signal, (iii) the third portion of the audio signal represents sounds above the volume threshold, (iv) the second portion of the audio signal is longer than a first predetermined duration, (v) the second portion of the audio signal is shorter than a second predetermined duration, and (vi) the first portion of the audio signal is longer than a third predetermined duration.

13. An apparatus as defined in claim 12, wherein determining if the first portion of the audio signal represents sounds above the volume threshold comprises determining if the first portion of the audio signal represents sounds above the volume threshold for at least a majority of the first portion of the audio signal.

14. An apparatus as defined in claim 12, wherein the memory device stores a parameter used in detecting the channel change event, the parameter being selected based on a type of equipment.

15. An apparatus as defined in claim 12, wherein the volume threshold comprises a moving average threshold and a volume constant.

16. An apparatus for detecting a channel change event, the apparatus comprising:
an analog-to-digital converter structured to capture an audio signal;
a memory device structured to store digital data indicative of a first portion, a second portion, and a third portion of the audio signal, wherein the memory device stores a parameter used in detecting the channel change event, the parameter being selected based on a type of equipment, wherein the parameter indicates that the type of equipment mutes audio when changing channels; and
a controller operatively coupled to the analog-to-digital converter and the memory device, the controller being structured to indicate the channel change event is detected if (i) the first portion of the audio signal represents sounds above a volume threshold, (ii) the second portion of the audio signal represents sounds below the volume threshold, and (iii) the third portion of the audio signal represents sounds above the volume threshold.

17. An apparatus as defined in claim 14, wherein the parameter is indicative of a duration associated with a muting period.

18. An apparatus for detecting a channel change event, the apparatus comprising:
an analog-to-digital converter structured to capture an audio signal;
a memory device structured to store digital data indicative of a first portion, a second portion, and a third portion of the audio signal; and
a controller operatively coupled to the analog-to-digital converter and the memory device, the controller being structured to indicate the channel change event is detected if (i) the first portion of the audio signal represents sounds below a volume threshold, (ii) the second portion of the audio signal represents sounds above the volume threshold for at least a majority of the second portion of the audio signal, and (iii) the third portion of the audio signal represents sounds below the volume threshold, (iv) the second portion of the audio signal is longer than a first predetermined duration, (v) the second portion of the audio signal is shorter than a second predetermined duration, and (vi) the first portion of the audio signal is longer than a third predetermined duration.

19. An apparatus as defined in claim 18, wherein determining if the first portion of the audio signal represents sounds below the volume threshold comprises determining if the first portion of the audio signal represents sounds below the volume threshold for at least a majority of the first portion of the audio signal.

20. An apparatus as defined in claim 18, wherein the memory device stores a parameter used in detecting the channel change event, the parameter being selected based on a type of equipment.

21. An apparatus as defined in claim 18, wherein the volume threshold comprises a moving average threshold and a volume constant.

22. An apparatus for detecting a channel change event, the apparatus comprising:
an analog-to-digital converter structured to capture an audio signal;
a memory device structured to store digital data indicative of a first portion, a second portion, and a third portion of the audio signal, wherein the memory device stores a parameter used in detecting the channel change event, the parameter being selected based on a type of equipment, wherein the parameter indicates that the type of equipment does not mute audio when changing channels; and a controller operatively coupled to the analog-to-digital converter and the memory device, the controller being structured to indicate the channel change event is detected if (i) the first portion of the audio signal represents sounds below a volume threshold, (ii) the second portion of the audio signal represents sounds above the volume threshold, and (iii) the third portion of the audio signal represents sounds below the volume threshold.

23. A non-transitory machine readable medium storing instructions, the instructions being structured to cause a machine to:

capture an audio signal;

read a parameter associated with a type of television equipment, the parameter indicating that the type of television equipment mutes audio when changing channels; and indicate that the channel change event is detected if (i) a first portion of the audio signal represents sounds above a volume threshold, (ii) a second portion of the audio signal represents sounds below the volume threshold, and (iii) a third portion of the audio signal represents sounds above the volume threshold.

24. A non-transitory machine readable medium as defined in claim 23, wherein the instructions are structured to cause the machine to:

determine if the second portion of the audio signal is longer than a first predetermined duration; and determine if the second portion of the audio signal is shorter than a second predetermined duration, wherein the instructions structured to cause the machine to determine if the second portion of the audio signal represents sounds below the volume threshold comprises instructions structured to cause the machine to determine if the second portion of the audio signal represents sounds below the volume threshold for at least a majority of the second portion of the audio signal.

25. A non-transitory machine readable medium as defined in claim 23, wherein the volume threshold comprises a moving average threshold and a volume constant.

26. A non-transitory machine readable medium storing instructions, the instructions being structured to cause a machine to:

capture a television audio signal;

read a parameter associated with a type of television equipment, the parameter indicating that the type of television equipment does not mute audio when changing channels; and indicate that the television channel change event is detected if (i) a first portion of the television audio signal represents sounds below a volume threshold, (ii) a second portion of the television audio signal represents sounds above the volume threshold, and (iii) a third portion of the television audio signal represents sounds below the volume threshold.

27. A non-transitory machine readable medium as defined in claim 26, wherein the instructions are structured to cause the machine to:

determine if the second portion of the television audio signal is longer than a first predetermined duration; and determine if the second portion of the television audio signal is shorter than a second predetermined duration, wherein the instructions structured to cause the machine to determine if the second portion of the television audio signal represents sounds below the volume threshold comprises instructions structured to cause the machine to determine if the second portion of the television audio signal represents sounds below the volume threshold for at least a majority of the second portion of the television audio signal.

28. A non-transitory machine readable medium as defined in claim 26, wherein the volume threshold comprises a moving average threshold and a volume constant.

29. An apparatus for detecting a television channel change event, the apparatus comprising:

a sampler structured to sample a television audio signal;

a threshold detector operatively coupled to the sampler to compare signals from the sampler with a threshold;

a buffer operatively coupled to the threshold detector to store a plurality of outputs from the threshold detector; and a state machine operatively coupled to the buffer to produce a signal indicative of a channel change event based on the plurality of outputs from the threshold detector stored in the buffer, structured to produce the signal indicative of the channel change event in response to detecting a transient audio signal comprising a first muted audio signal and to distinguish between the first muted audio signal and a second muted audio signal, wherein the second muted audio signal is indicative of a user muted condition.

* * * * *